(12) United States Patent
Yi et al.

(10) Patent No.: US 10,616,840 B2
(45) Date of Patent: Apr. 7, 2020

(54) DETECTION METHOD, SYNCHRONIZATION METHOD, AND TERMINAL FOR SYMMETRICAL SYNCHRONIZATION SIGNAL

(71) Applicant: Shanghai Research Center For Wireless Communications, Shanghai (CN)

(72) Inventors: Hui-yue Yi, Shanghai (CN); Jiang Wang, Shanghai (CN); Jing Xu, Shanghai (CN); Yang Yang, Shanghai (CN); Hai-feng Wang, Shanghai (CN)

(73) Assignee: Shanghai Research Center For Wireless Communications, Shanghai (CN)

( * ) Notice: Subject to any disclaimer, the term of this patent is extended or adjusted under 35 U.S.C. 154(b) by 133 days.

(21) Appl. No.: 15/671,887

(22) Filed: Aug. 8, 2017

(65) Prior Publication Data

US 2018/0192382 A1   Jul. 5, 2018

(30) Foreign Application Priority Data

Dec. 31, 2016   (CN) .......................... 2016 1 1270454

(51) Int. Cl.
*H04W 56/00* (2009.01)
*H04J 11/00* (2006.01)
*H04L 27/26* (2006.01)

(52) U.S. Cl.
CPC ....... *H04W 56/001* (2013.01); *H04J 11/0073* (2013.01); *H04L 27/2626* (2013.01);
(Continued)

(58) Field of Classification Search
CPC .............. H04W 56/001; H04J 11/0073; H04L 27/2626; H04L 27/2663; H04L 27/2675; H04L 27/2678; H04L 27/2607
See application file for complete search history.

(56) References Cited

U.S. PATENT DOCUMENTS

| | | | |
|---|---|---|---|
| 6,891,815 B1 * | 5/2005 | Song | H04B 1/707 370/335 |
| 2010/0195700 A1 * | 8/2010 | Ogawa | H04J 13/0062 375/132 |

FOREIGN PATENT DOCUMENTS

| | | | | |
|---|---|---|---|---|
| WO | 2008024173 A2 | 2/2008 | | |
| WO | WO-2016141992 A1 * | 9/2016 | ........... | H04L 5/0053 |

OTHER PUBLICATIONS

Branislav M. Popovic, Fredrik Berggren, Primary Synchronization Signal in E-UTRA, Conference, Aug. 25-28, 2008, pp. 426-430, 978-1-4244-2204-3, IEEE, Bologna, Italy.

(Continued)

*Primary Examiner* — Michael Thier
*Assistant Examiner* — Brian P Cox
(74) *Attorney, Agent, or Firm* — Guosheng Wang; United States Research and Patent Firm

(57) ABSTRACT

The present invention discloses a detection method, a synchronization method, and a terminal for a symmetrical synchronization signal. The detection method includes the following steps: obtaining a received signal of a synchronization signal for synchronous detection, and subsequently, performing an auto-correlation calculation on the received signal twice in the time domain, where the received signal includes a first-part received signal whose length is N and a second-part received signal whose length is $N_{CP}$, the first-part received signal is symmetrical about a first central point, and the second-part received signal is symmetrical about a second central point. With low complexity of calculation and good detection performance, and being insensitive to a carrier frequency offset (CFO), the present invention is particularly applicable to an Internet of Things (IoT) environment.

8 Claims, 14 Drawing Sheets

(52) U.S. Cl.
CPC ...... *H04L 27/2663* (2013.01); *H04L 27/2675* (2013.01); *H04L 27/2678* (2013.01); *H04L 27/2607* (2013.01)

(56) References Cited

OTHER PUBLICATIONS

Eun Su Kang, Humor Hwang, Dong Seog Han, A fine carrier recovery algorithm robust to doppler shift for OFDM systems, Conference, Jan. 9-13, 2010, pp. 1218-1222, IEEE, Las Vegas, NV, USA.

Wang Dan, Shi Weiping, Li Xiaowen,Low-Complexity Carrier Frequency Offset Estimation Algorithm in TD-LTE, journal, Oct. 2013, pp. 2220-2226, Vol. 8, No. 10, Journal of networks, Finland.

\* cited by examiner

DETECTION METHOD, SYNCHRONIZATION METHOD, AND TERMINAL FOR SYMMETRICAL SYNCHRONIZATION SIGNAL

CROSS REFERENCE TO RELATED APPLICATIONS

Benefit is claimed to Chinese Patent Application No. 201611270454.6, filed Dec. 31, 2016, the contents of which are incorporated by reference herein in their entirety.

BACKGROUND

Technical Field

The present invention relates to the field of wireless communications technologies, and in particular, to a detection method for a symmetrical synchronization signal, a corresponding synchronization method, and a terminal thereof.

RELATED ART

In a 5G communications system in the future, various terminal devices, such as a user equipment (UE for short) and an Internet-of-Things (IoT for short) device, access a network in a wireless manner. This requires that these terminal devices implement synchronization with a base station by detecting a synchronization signal sent by the base station. For an IoT device (such as a sensor) with low power consumption and a simple function, because its crystal oscillator precision is low, a relatively large carrier frequency offset (CFO for short) is caused. To make the IoT device rapidly implement synchronization with the base station, a synchronization signal detection algorithm needs to be insensitive to a CFO and have features such as good detection performance and low complexity of calculation.

In a wireless communications system, a base station sends a primary synchronization signal (PSS) and a secondary synchronization signal (SSS), to perform cell identification and frame synchronization operations. A synchronization process includes two phases. In the first phase, a UE obtains symbol synchronization information, CFO information, and cell identity information by using the PSS. In the second phase, the UE detects a border of a frame, a cyclic prefix (CP for short) length, or the like by using the SSS.

In the prior art, B. Popovic and F. Berggren set forth a matched filtering-based PSS detection method (an MF method for short) in their paper "Primary synchronization signal in EUTRA" (in Proc. IEEE Int. Sympos. Spread Spectrum Techniques and Applic. (ISSSTA '08), Bologna, Italy, August 2008, pp. 426-430). The detection method is greatly affected by a CFO. When the CFO is relatively large, the detection method has poor detection performance Eun Su Kang, Humor Hwang, and Dong Seog Han set forth a cross correlation-autocorrelation calculation-based PSS detection method and CFO estimation and compensation method (a cross correlation-autocorrelation method for short) in their paper "A Fine Carrier Recovery Algorithm Robust to Doppler Shift for 01-DM Systems" (IEEE Transactions on Consumer Electronics, 2010, 56(3) pp. 1218-1222). In addition, Dan Wang, Weiping Shi, and Xiaowen Li set forth a PSS detection method and a CFO estimation and compensation algorithm using a two-step correlation calculation (an autocorrelation-autocorrelation method for short) in their paper "Low-Complexity Carrier Frequency Offset Estimation Algorithm in TD-LTE" (Journal of Networks, vol. 8, No. 10, October 2013, pp. 2220-2226).

However, after all, the various existing major detection methods and synchronization methods achieve no ideal technical effects, especially for UEs in the IoT.

SUMMARY

A principal technical problem resolved by the present invention is to provide a detection method for a symmetrical synchronization signal. With low complexity of calculation and good detection performance, the method is insensitive to a CFO.

Another technical problem resolved by the present invention is to provide a synchronization method for a symmetrical synchronization signal.

Still another technical problem resolved by the present invention is to provide a communications terminal for detecting a symmetrical synchronization signal.

To achieve the foregoing objectives of the invention, the following technical solutions are used in the present invention:

A detection method for a symmetrical synchronization signal, comprising the following steps:

calculating a first-part-first-autocorrelation function for each term symmetrical in time domain;

calculating a second-part-first-autocorrelation function of each symmetrical term of cyclic prefix (CP), performing a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] + \sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m,\theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol; and detecting the PSS by detecting a peak of $|P(m,\theta)|$ that is greater than or equal to a predetermined threshold.

Preferably, the second correlation calculation is:

performing a second autocorrelation calculation on the first-part-first-autocorrelation function, to obtain a first-part-second-autocorrelation function; and performing a second correlation calculation on the second-part-first-autocorrelation function, to obtain a second-part-second-correlation function.

Preferably, performing the second correlation calculation on the second-part-first-autocorrelation function includes performing correlation calculation on the second-part-first-autocorrelation function and the first-part-first-autocorrelation function.

Preferably, performing the second correlation calculation on the first-part-first-autocorrelation function is: performing the autocorrelation calculation on the first-part-first-autocorrelation function based on a symmetry center of the first-part-first-autocorrelation function.

According to a second aspect of the embodiments of the present invention, a synchronization method for a symmetrical synchronization signal is provided, including the following steps:

calculating a first-part-first-autocorrelation function for each term symmetrical in time domain;

calculating a second-part-first-autocorrelation function of each symmetrical term of cyclic prefix (CP);

performing a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] +$$

$$\sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m,\theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol; and compensating the received signal by using the test statistics of the received signal of PSS.

Preferably, after the compensation, obtain a sequence number of the PSS sequence for signal synchronization.

According to a third aspect of the embodiments of the present invention, a communications terminal for detecting a symmetrical synchronization signal is provided, including a signal processing unit, wherein:

the signal processing unit calculates a first-part-first-autocorrelation function for each term symmetrical in time domain;

calculates a second-part-first-autocorrelation function of each symmetrical term of cyclic prefix (CP);

performs a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] +$$

$$\sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m,\theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol; and detects the PSS by detecting a peak of $|P(m,\theta)|$ that is greater than or equal to a predetermined threshold.

Preferably, the signal processing unit compensates the received signal by using the detection value test statistics of the received signal of PSS, Compared with the prior art, the present invention has the following advantages:

(1) The present invention is not affected by a CFO, effectively increasing a detection signal-to-noise ratio (SNR), thereby improving PSS detection and synchronization performance in a case of a low SNR.

(2) The present invention calculates, by using more symmetrical information, a test statistics for PSS detection, thereby effectively improving PSS detection performance, and achieving better detection performance in a condition of a low SNR.

(3) The present invention has relatively low complexity of calculation; therefore, it is easy to implement, and is especially applicable to a network environment such as the IoT.

DETAILED DESCRIPTION

Technical content of the present invention is described in detail below with reference to the accompanying drawings and specific embodiments.

Figure 1:
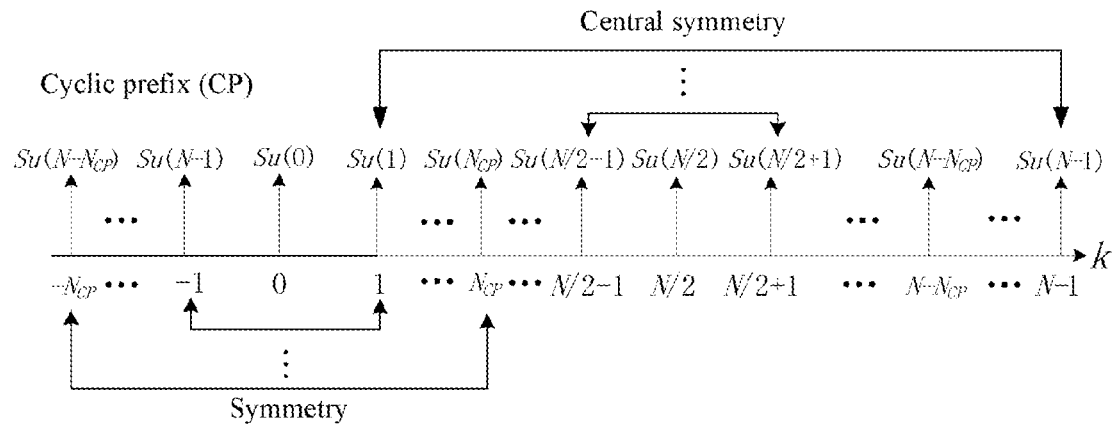
FIG. 1 is a schematic diagram of a time domain transmitted signal of a PSS including a CP.

FIG. 1 is a schematic diagram of a time domain transmitted signal of a PSS (Primary Synchronization Signal). As shown in FIG. 1, the PSS sequence at a transmit end has sequence symmetry in a time domain and its CP (Cyclic Prefix) has a symmetry property. A combination of the two is briefly referred to as bi-symmetry. Based on the bi-symmetry, the present invention provides a detection method based on two sliding autocorrelation calculations. A person skilled in the art may understand that, the present invention is not limited to synchronous detection of the PSS. The detection method provided by the present invention can be used for any synchronization signal, provided that the synchronization signal has bi-symmetry in a time domain. Similarly, if a synchronization signal has bi-symmetry in a frequency domain, synchronous detection in the frequency domain may be performed with reference to the technical ideas of the present invention.

The detection method mainly includes the following three steps, which are specifically described as follows:

Step 1: A UE calculates an autocorrelation value of each symmetrical signal for each sliding value by using a sliding autocorrelation technology, according to a time domain symmetry of the PSS sequence in combination with a symmetry property of its CP.

Step 2: Perform an autocorrelation calculation on the autocorrelation values, and then perform a summation, to obtain a test statistics for PSS detection.

Step 3: Obtain an estimated value of a time offset and an estimated value of a CFO (Carrier Frequency Offset) according to a peak value of the test statistics for PSS detection, so as to implement symbol synchronization and complete synchronous detection.

Subsequently, the UE implements time synchronization and CFO compensation for a received signal by using the estimated value of the time offset and the estimated value of the CFO that are obtained in step 3. Finally, a sequence number of the PSS sequence sent by a base station is determined by a cross-correlation calculation result between the received signal after the CFO compensation and the PSS.

As is known to all, a time domain received baseband signal r(n) of a PSS that includes a CP may be expressed as:

$$r(n) = e^{\frac{j2\pi n\varepsilon}{N}} \sum_{k=0}^{M-1} h(k)s_u(n-\theta-k) + z(n) \quad (1)$$

Wherein, $s_u(n)$ is a PSS sent by the base station and is a Zadoff-Chu (ZC) sequence in an LTE system, where the subscript u is a root sequence index. In addition, h(k) is a channel response function having M multipath channels, where M is a delay length of the multipath channel, $\theta$ indicates a time offset that needs to be estimated, $\varepsilon$ is a normalized CFO in a received signal, and z(n) is additive noise. However, the time offset $\theta$ and the CFO $\varepsilon$ in the PSS r(n) are unknown and need to be estimated. Before the time offset $\theta$ is estimated, a synchronization signal needs to be detected.

The present invention combines the time domain symmetry of the PSS and the symmetry property of the CP, and uses a method based on two sliding autocorrelation calculations to perform PSS detection. The following further describes this in detail.

For convenience of analysis, it is assumed that the channel is an AWGN channel. It is assumed that a length of an OFDM symbol is N (N is a positive integer, the same below), a length of the CP is $N_{CP}$, and a form of the received PSS signal including the CP is shown in the following formula (2).

$$r(n) = \begin{cases} e^{\frac{j2\pi n\varepsilon}{N}} s_u(n-\theta+N) + z(n), n = -N_{CP}, -N_{CP+1}, \cdots, -1 \\ e^{\frac{j2\pi n\varepsilon}{N}} s_u(n-\theta) + x(n), n = 0, 1, \cdots, N-1 \end{cases} \quad (2)$$

Assuming that a time synchronization point of the PSS is m, the formula (2) may be expressed as:

$$r(k) = \begin{cases} e^{\frac{j2\pi k\varepsilon}{N}} s_u(m+k+N) + z(n), n = -N_{CP}, -N_{CP+1}, \cdots, -1 \\ e^{\frac{j2\pi k\varepsilon}{N}} s_u(m+k) + x(n), n = 0, 1, \cdots, N-1 \end{cases} \quad (3)$$

Figure 2:
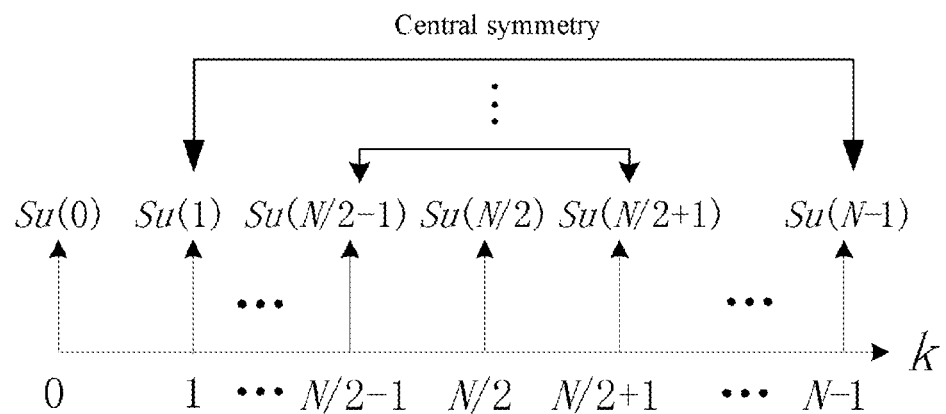
FIG. 2 is a schematic diagram of a symmetry property of a time domain received signal, which is symmetrical about N/2, of a PSS.
Figure 3:
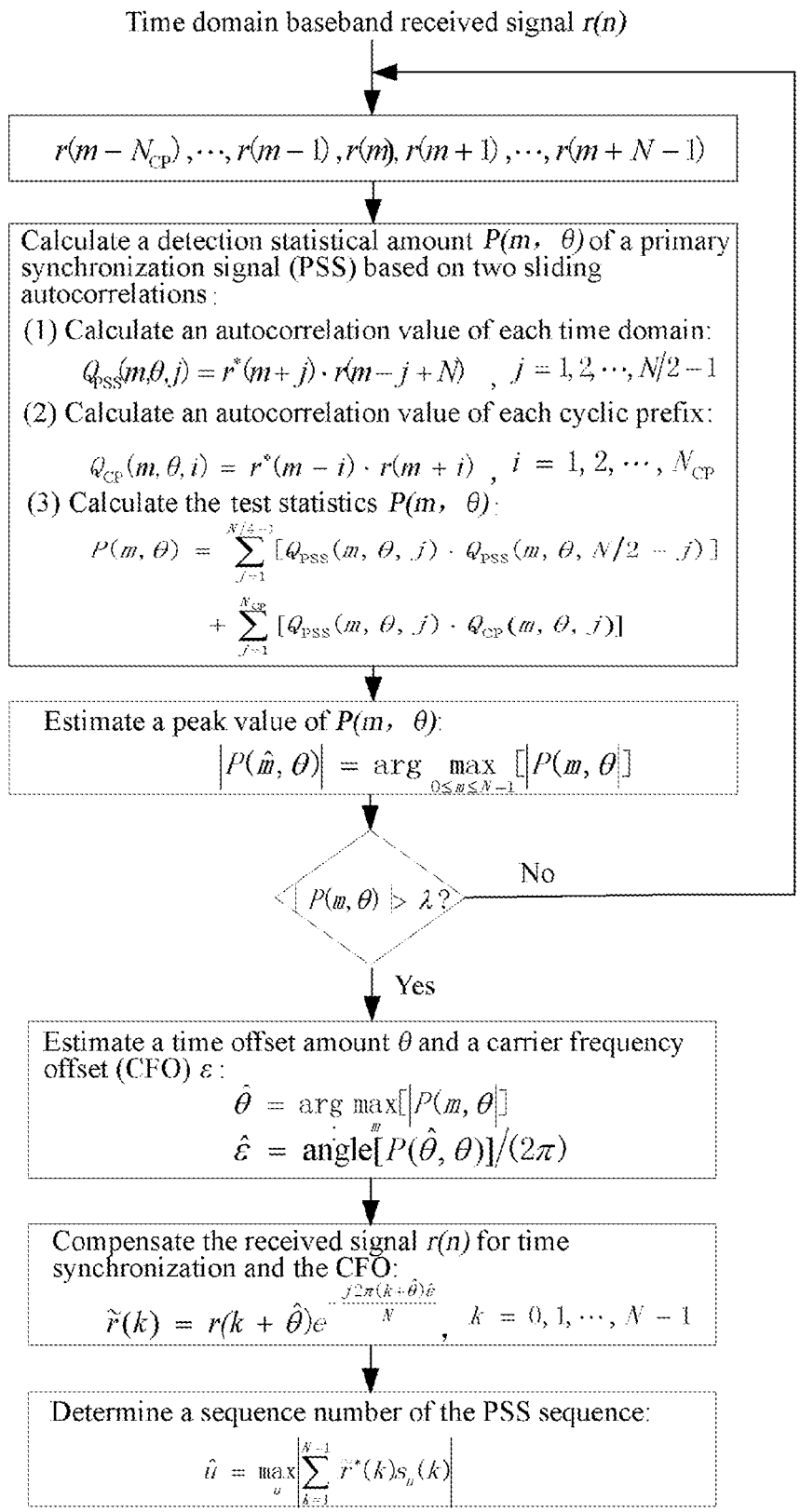
FIG. 3 is a block flowchart of a detection method and a synchronization method according to the present invention.

With reference to the foregoing formulas and FIG. 2, a total length of the received PSS sequence that includes the CP is $N+N_{CP}$. The received PSS sequence includes two parts: a first-part received signal is a sequence whose length is N, and is expressed as r(m), r(m+1), r(m+2), . . . , r(m+r(m+N/2−1), . . . , r(m+N−2), and r(m+N−1); a second-part received signal is a sequence of length $N_{CP}$, corresponds to the CP part, and is expressed as r(m−$N_{CP}$), . . . , and r(m−1). In an OFDM system, the CP is acquired by duplicating $N_{CP}$ points at the end of the OFDM symbol to the beginning of the symbol.

For the first-part received signal, that is, r(m), r(m+1), . . . , r(m+N/2), . . . , and r(m+N−1), which is the part of the received PSS signal received in a conventional time domain Thus, except for the first point and the $N/2^{th}$ point, the received PSS signal is symmetrical about the $N/2^{th}$ term (that is, r(m+N/2)) in the time domain. In other words, r(m+1), r(m+2), . . . , r(m+N/2−1), r(m+N/2+1), . . . , r(m+N−2), and r(m+N−1) is symmetrical point-by-point about r(m+N/2).

The second-part received signal in the received PSS signal includes the CP. That is, the received signal of the CP is r(m−$N_{CP}$), . . . , and r(m−1). In addition, r(m−$N_{CP}$), . . . , r(m−1) are symmetrical point-by-point about r(m) to r(m+1), . . . , r(m+$N_{CP}$).

The detection method provided by the present invention includes the following step 1 and step 2. Further, synchronization is performed by using the detected PSS, and a corresponding synchronization method includes the following step 3 to step 5.

Step 1: Calculate a test statistics of the PSS based on two sliding correlations.

Assuming that the received signal is synchronized atm, the received signal is r(m $N_{CP}$), . . . , r(m−1), r(m), r(m+1), . . . , and r(m+N−1). Specific steps of calculating a test statistics P(m,θ) of the PSS are as follows:

(1) First, calculate a first autocorrelation function (a first-part-first-autocorrelation function $Q_{PSS}(m,\theta,j)$) for each term symmetrical in time domain:

$$Q_{PSS}(m,\theta,j) = r^*(m+j) \cdot r(m-j+N), j=1,2, \ldots, N/2-1 \quad (4)$$

Specifically, when a sliding value m is equal to a time offset θ, that is, m=0. The first-part received signal r(m+1), r(m+2), ... r(m+N/2−1) is symmetrical point-by-point about r(m+N/2) (a first center of symmetry) to r(m+N/2+1), ... r(m+N−2), and r(m+N−1). Therefore, an autocorrelation function of a time domain symmetrical term about each symmetrical point may be calculated according to the following formula, to obtain the first-part-first-autocorrelation function:

$$Q_{PSS}(m, \theta, 1) = r^*(m+1)r(m-1+N) = \qquad (5)$$
$$s_u^*(1)e^{\frac{j2\pi\varepsilon(m+1)}{N}}s_u(-1+N)e^{\frac{j2\pi\varepsilon(m-1+N)}{N}} = |s_u(1)|^2 e^{\frac{j2\pi\varepsilon(N-2)}{N}}$$

$$Q_{PSS}(m, \theta, 2) = r^*(m+2)r(m-2+N) = \qquad (6)$$
$$s_u^*(2)e^{\frac{j2\pi\varepsilon(m+2)}{N}}s_u(-2+N)e^{\frac{j2\pi\varepsilon(m-2+N)}{N}} = |s_u(2)|^2 e^{\frac{j2\pi\varepsilon(N-4)}{N}}$$

...

$$Q_{PSS}(m, \theta, N/2 - 2) = \qquad (7)$$
$$r^*[m+(N/2-2)]r[m+(N/2+2)] = s_u^*[N/2-2]e^{\frac{j2\pi\varepsilon(m+N/2-2)}{N}}$$
$$s_u[-(N/2+2)+N]e^{\frac{j2\pi\varepsilon(m+N/2+2)}{N}} = |s_u(N/2-2)|^2 e^{\frac{j2\pi\varepsilon(4)}{N}}, \text{ and}$$

$$Q_{PSS}(m, \theta, N/2 - 1) = \qquad (8)$$
$$r^*[m+(N/2-1)]r[m+(N/2+1)] = s_u^*[N/2-1]e^{\frac{j2\pi\varepsilon(m+N/2-1)}{N}}$$
$$s_u[-(N/2+1)+N]e^{\frac{j2\pi\varepsilon(m+N/2+1)}{N}} = |s_u(N/2-1)|^2 e^{\frac{j2\pi\varepsilon(2)}{N}}$$

(2) Subsequently, calculate a first autocorrelation function (a second-part-first-autocorrelation function $Q_{CP}(m,\theta,i)$) of each symmetrical term of the CP:

$$Q_{CP}(m,\theta,i)=r^*(m+i)\cdot r(m+i), i=1,2,\ldots,N_{CP}.$$

Specifically, when the sliding value m is equal to the time offset θ (m=θ), the second-part of the received signal is symmetrical about a second symmetry center r(m). That is, $r(m-N_{CP})$, ..., r(m−1) are symmetrical point-by-point about r(m) to r(m+1), ..., and $r(m+N_{CP})$. Therefore, the autocorrelation function about each symmetrical point may be calculated according to the following formula:

$$Q_{CP}(m, \theta, 1) = r(m+1)r^*(m-1) = \qquad (9)$$
$$s_u(1)e^{\frac{j2\pi\varepsilon(m+1)}{N}}s_u^*(N-1)e^{\frac{j2\pi\varepsilon(m-1)}{N}} = |s_u(1)|^2 e^{\frac{j2\pi\varepsilon(2)}{N}}$$

$$Q_{CP}(m, \theta, 2) = r(m+2)r^*(m-2) = \qquad (10)$$
$$s_u(2)e^{\frac{j2\pi\varepsilon(m+2)}{N}}s_u^*(N-2)e^{\frac{j2\pi\varepsilon(m-2)}{N}} = |s_u(2)|^2 e^{\frac{j2\pi\varepsilon(4)}{N}}$$

...

$$Q_{CP}(m, \theta, N_{CP}) = \qquad (11)$$
$$r(m+N_{CP})r^*(m-N_{CP}) = s_u(N_{CP})e^{\frac{j2\pi\varepsilon(m+N_{CP})}{N}}s_u^*(N-N_{CP})$$
$$e^{\frac{j2\pi\varepsilon(m-N_{CP})}{N}} = |s_u(N_{CP})|^2 e^{\frac{j2\pi\varepsilon(N_{CP})}{N}}$$

(3) Perform a second correlation calculation on the first-part-first-autocorrelation function and the second-part-first-autocorrelation function, to obtain a first-part-second-autocorrelation function and a second-part-second-correlation function respectively.

It is seen that exponentials in the foregoing formulas all include the normalized frequency offset ε and the length N of the PSS. Therefore, the exponential N needs to be eliminated. In addition, when the sliding value m is equal to the time offset θ (m=θ), the first-part-first-autocorrelation function $Q_{PSS}(m,\theta,j)$ is symmetrical point-to-point about the $N/4^{th}$ term (the symmetry center).

Therefore, when the sliding value m is equal to the time offset θ (m=θ), an autocorrelation calculation is performed again on the first-part-first-autocorrelation function that has N/2−1 terms, to obtain a first-part-second-autocorrelation function. This is specifically as follows:

$$Q(m, \theta, 1) = \qquad (12)$$
$$Q_{PSS}(m, \theta, 1)\cdot Q_{PSS}\left(m, \theta, \frac{N}{2}-1\right) = |s_u(1)|^2 \left|s_u\left(\frac{N}{2}-1\right)\right|^2 e^{j2\pi\varepsilon}$$

$$Q(m, \theta, 2) = \qquad (13)$$
$$Q_{PSS}(m, \theta, 2)\cdot Q_{PSS}\left(m, \theta, \frac{N}{2}-2\right) = |s_u(2)|^2 \left|s_u\left(\frac{N}{2}-2\right)\right|^2 e^{j2\pi\varepsilon}$$

...

$$Q(m, \theta, n) = \qquad (14)$$
$$Q_{PSS}(m, \theta, n)\cdot Q_{PSS}\left(m, \theta, \frac{N}{2}-n\right) = |s_u(n)|^2 \left|s_u\left(\frac{N}{2}-n\right)\right|^2 e^{j2\pi\varepsilon}$$
$$(n = 1, 2, \ldots, N/4)$$

The second-part-first-autocorrelation function has $N_{CP}$ terms. Correlation calculation is performed on the second-part-first-autocorrelation function and the first-part-first-autocorrelation function, to obtain the following second-part-second-correlation function. This is specifically as follows:

$$\overline{Q}(m,\theta,1)=Q_{PSS}(m,\theta,1)\cdot Q_{CP}(m,\theta,1)=|s_u(1)|^4 e^{j2\pi\varepsilon} \qquad (15)$$

$$\overline{Q}(m,\theta,2)=Q_{PSS}(m,\theta,2)\cdot Q_{CP}(m,\theta,2)=|s_u(2)|^4 e^{j2\pi\varepsilon} \qquad (16)$$

$$\overline{Q}(m,\theta,N_{CP})=Q_{PSS}(m,\theta,N_{CP})\cdot Q_{CP}(m,\theta,N_{CP})=|s_u(N_{CP})|^4 e^{j2\pi\varepsilon} \qquad (17)$$

As shown in the formula (17), the second correlation function $\overline{Q}(m,\theta,i)$ of the received signal of the CP is the correlation function of the second-part-first-autocorrelation function $Q_{CP}(m,\theta,i)$ and the first-part-first-autocorrelation function $Q_{PSS}(m,\theta,i)$.

(4) Calculate the test statistics $P(m,\theta)$ of the received signal of the PSS based on the second correlation function.

As shown in the following formula (18), the first-part-second-autocorrelation function and the second-part-second-correlation function are added, to obtain the test statistics $P(m,\theta)$ of the received signal of the PSS.

$$P(m, \theta) = \sum_{j=1}^{N/4-1} [Q_{PSS}(m, \theta, j)\cdot Q_{PSS}(m, \theta, N/2-j)] + \qquad (18)$$
$$\sum_{j=1}^{N_{CP}} [Q_{PSS}(m, \theta, j)\cdot Q_{CP}(m, \theta, j)], m = 0, 1, \cdots, N-1$$

Step 2: Detect the PSS.

When the sliding value m is equal to the time offset value θ, a modulus of test statistics $|P(m,\theta)|$ in the formula (18) reaches the maximum. The maximum of $|P(m,\theta)|$ may be estimated as follows:

$$|P(\hat{m}, \theta)| = \arg\max_{0\leq m\leq N-1} [|P(m, \theta)|] \qquad (19)$$

Therefore, when a peak of |P(m,θ)| is detected, and the peak |P(m̂,θ)| is greater than or equal to a predetermined threshold λ, it may be considered that a PSS is detected.

Subsequently, go to step 3, to perform estimation and compensation on the time offset and the CFO by using the PSS detected in the detection method provided by the present invention.

A person skilled in the art may understand that, by using the detection method provided by the present invention, after the PSS is detected, estimation and compensation of the time offset and the CFO could be implemented in steps, different from the following step 3 to step 5.

Step 3: Estimate a time offset and a CFO.

The time offset is estimated as a value m when |P(m,θ)| is maximum, which is specifically as follows:

$$\tilde{r}(k) = r(k+\hat{\theta})e^{-\frac{j2\pi(k+\hat{\theta})\hat{\varepsilon}}{N}}, k=0,1,\cdots,N-1 \quad (22)$$

In the formula (20), $\hat{\theta}$ is a starting point of the PSS in the time domain. Subsequently, the CFO may be estimated according to a phase value of $P(\hat{\theta},\theta)$ as follows:

$$\hat{\varepsilon} = \text{angle}[P(\hat{\theta},\theta)]/(2\pi) \quad (21)$$

Step 4: Time synchronization and CFO Compensation of the PSS.

Synchronization is performed on the received signal r(n) in the formula (1) by the estimated value $\hat{\theta}$ of the time offset obtained in step 2, and a phase compensation is performed on the received signal r(n) by the estimated value $\hat{\varepsilon}$ of the CFO. In a Gaussian channel hypothesis, after the time synchronization and the CFO compensation to the received signal r(n) in the formula (2), the following formula is obtained:

$$\hat{\theta} = \arg\max_{m} \left[ |P(m,\theta)| \right] \quad (20)$$

Step 5: Determine a sequence number of the PSS sequence.

After the time synchronization and the CFO compensation, the sequence number u of the sent PSS sequence is determined by performing cross correlation calculation on $\tilde{r}(k)$ in the formula (22) and the transmitted sequence $s_u(k)$ as follows:

$$\hat{u} = \max_{u} \left| \sum_{k=1}^{N-1} \tilde{r}^*(k) s_u(k) \right| \quad (23)$$

Finally, complexity of calculation of the present invention is analyzed. For each value m, calculation of the first autocorrelation function needs ($N/2-1+N_{CP}$) times of complex multiplication (CM), and calculation of the second autocorrelation function needs $N/4-1+N_{CP}$ times of complex multiplication (CM) and $N/4+N_{CP}-3$ times of complex addition (CA). Therefore, overall complexity of the algorithm provided by the present invention is $N(3N/4+2N_{CP}-2)$ times of complex multiplication (CM) and $N(N/4+N_{CP}-3)$ times of complex addition (CA). Therefore, the PSS detection method, the corresponding time synchronization method and the CFO estimation method provided by the present invention can greatly improve PSS detection performance and the CFO estimation performance. In addition, these methods have low complexity of calculation and are easy to implement.

Based on the foregoing detection method, the present invention further provides a communications terminal, which can implement the foregoing detection method for a symmetrical synchronization signal. The communications terminal may be a mobile communications terminal having a relatively strong signal processing capability such as a mobile phone, or may be an IoT terminal whose signal processing capability is not strong such as a sensor.

In one embodiment of the present invention, the communications terminal has a signal processing unit, configured to detect a synchronization signal. Herein, the signal processing unit obtains a received signal of a PSS signal for synchronous detection. The received signal includes a first-part received signal whose length is N and a second-part received signal whose length is $N_{CP}$. In addition, the first-part received signal is symmetrical about a first central point, and the second-part received signal is symmetrical about a second central point.

Subsequently, the signal processing unit performs a correlation calculation on the received signal. Specifically, the correlation calculation is performed on the first-part received signal, to obtain a first-part-first-autocorrelation function, and the correlation calculation is performed on the second-part received signal, to obtain a second-part-first-correlation function. Then, a second correlation calculation is performed on the first-part-first-autocorrelation function, to obtain a first-part-second-autocorrelation function; and the second correlation calculation is performed on the second-part-first-autocorrelation function, that is, correlation calculation is performed on the second-part-first-autocorrelation function and the first-part-first-autocorrelation function, to obtain a second-part-second-correlation function. Finally, the first-part-second-autocorrelation function and the second-part-second-correlation function are added, to obtain a detection value. The signal processing unit compensates the received signal for a time offset and a CFO offset by using the detection value, and then determines a sequence number of a PSS sequence.

The following table 1 brings together a performance comparison status of the present invention and a similar method in the prior art.

TABLE 1

Comparison of the present invention and a similar method in the prior art

| | MF method | Cross correlation – autocorrelation method | Autocorrelation – autocorrelation method | The present invention |
|---|---|---|---|---|
| Algorithm complexity CA | 3N (N − 1) | 3N(N/2 − 1) | N(N/4 − 2) | N(N/4 + 2Ncp − 2) |
| CM | 3N(N + 1) | 3N(1.5N + 1) | N(3N/4 − 2) | N(3N/4 + 2Ncp − 2) |
| PSS detection and synchronization performance | Sensitive to a CFO | Insensitive to a CFO | Insensitive to a CFO | Insensitive to a CFO |

It can be learned from Table 1 that, compared with a similar method in the prior art, the present invention has the following advantages:

(1) Compared with the MF method, the present invention is not affected by a CFO, effectively increasing a detection SNR, thereby improving synchronization signal detection and synchronization performance in a case of a low SNR.

Specifically, the MF method is greatly affected by a CFO $\varepsilon$. In addition, when the CFO $\varepsilon$ is relatively large, the MF method has poor detection performance. In comparison, because a sliding autocorrelation technology is used to perform detection and synchronization of a PSS in the present invention, the detection performance of the present invention is not affected by the CFO $\varepsilon$. In addition, in the present invention, a sequence number of a sent PSS sequence is determined only after synchronization and compensation of a CFO are performed on the received signal. It can be learned that determining of the sequence number of the PSS is not affected by the CFO $\varepsilon$.

(2) Compared with the existing cross correlation-autocorrelation method and autocorrelation-autocorrelation method, the present invention calculates, by using more symmetrical information, a test statistics for PSS detection, thereby effectively improving PSS detection performance, and achieving better detection performance in a condition of a low SNR.

In addition, the present invention has relatively low complexity of calculation; therefore, it is easy to implement, and is applicable to an environment such as the IoT. The performance of the present invention is verified by means of simulation, and the present invention is compared with a similar method in the prior art. In the simulation, a PSS sequence (occupying 62 subcarriers in the center of a frequency band) of a root sequence $\mu=25$ in an LTE system is used, and a length of IFFT is N=512. In addition, it is assumed that a time domain sample point length is L=512, and a location of a time domain starting point of the PSS is $\theta=257$. The following first provides a simulation result on an AWGN channel, and then provides a simulation result on a typical multipath channel (for example, a pedestrian channel B, with six paths).

Figure 4:
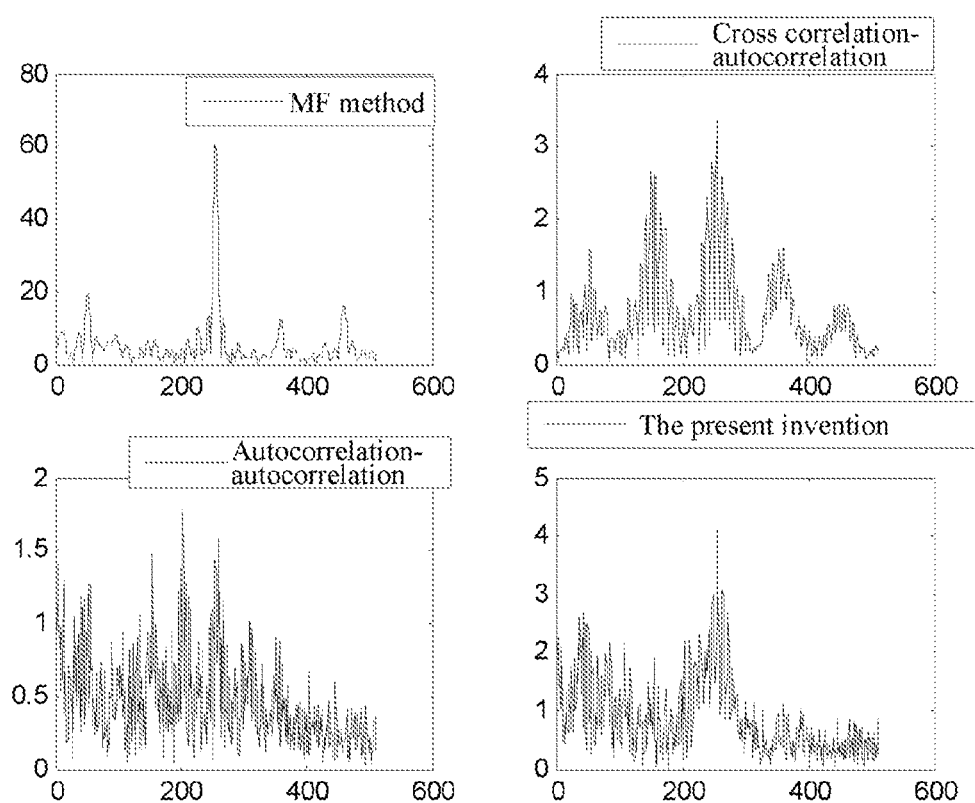
FIG. 4 is a simulation diagram of a test statistics (SNR=10 dB) in various methods on an AWGN channel when $\varepsilon=0.1\Delta f$.
Figure 5:
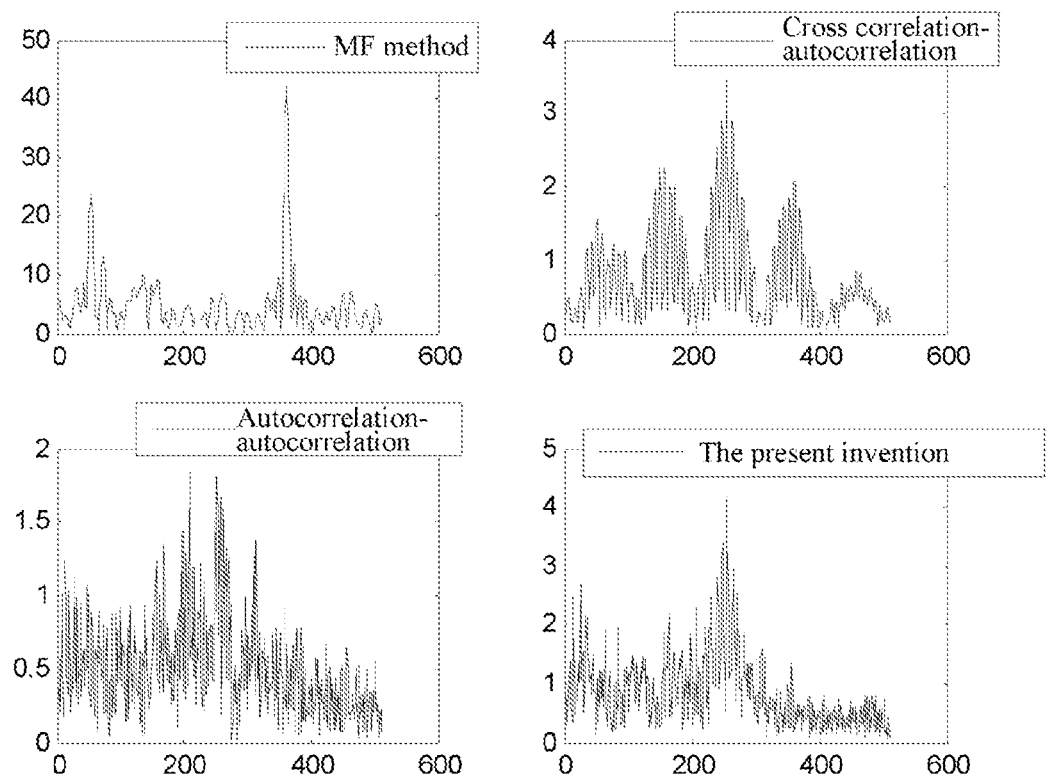
FIG. 5 is a simulation diagram of a test statistics (SNR=10 dB) in various methods on an AWGN channel when $\varepsilon=1.8\Delta f$.

A. A Simulation Result on an AWGN Channel (a) Impact of a CFO on PSS Detection and Synchronization Performance In this subparagraph, impact of a CFO on PSS detection and synchronization performance of the present invention is to be verified. In simulation, an SNR is equal to 10 dB, a subcarrier quantity N of an OFDM symbol is equal to 512, a length of a CP Ncp is equal to 64, a sequence number of a root sequence of a PSS is u=25, and $\Delta f=15$ kHz is a subcarrier spacing. FIG. 4 provides a test statistics in various methods when $\varepsilon=0.1\Delta f$. FIG. 5 provides a test statistics in various methods when $\varepsilon=1.8\Delta f$. It can be learned from FIG. 4 and FIG. 5 that, when the CFO $\varepsilon=0.1\Delta f$, the MF method can also have good detection and synchronization performance, but when $\varepsilon=0.8\Delta f$, a time synchronization location of the MF method is distant from an actual synchronization location, and therefore, even if an SNR is high, synchronization cannot be completed. It can be seen that the MF method is sensitive to the CFO.

Different from the MF method, in the other three methods (including the present invention), detection and synchronization can be performed when the CFO is either large or small, that is, their detection performance is not affected by the CFO. However, in the autocorrelation-autocorrelation method, a difference between a primary peak value and a secondary peak value is not obvious. Compared with the other two existing methods, regardless of a large or small CFO, a difference between a primary peak and a second peak in the present invention is more obvious, and therefore, the present invention has better PSS detection and synchronization performance. Therefore, the present invention is better than the existing autocorrelation-autocorrelation method and cross correlation-autocorrelation method.

(b) Impact of an SNR on PSS Detection and Synchronization Performance

Figure 6:
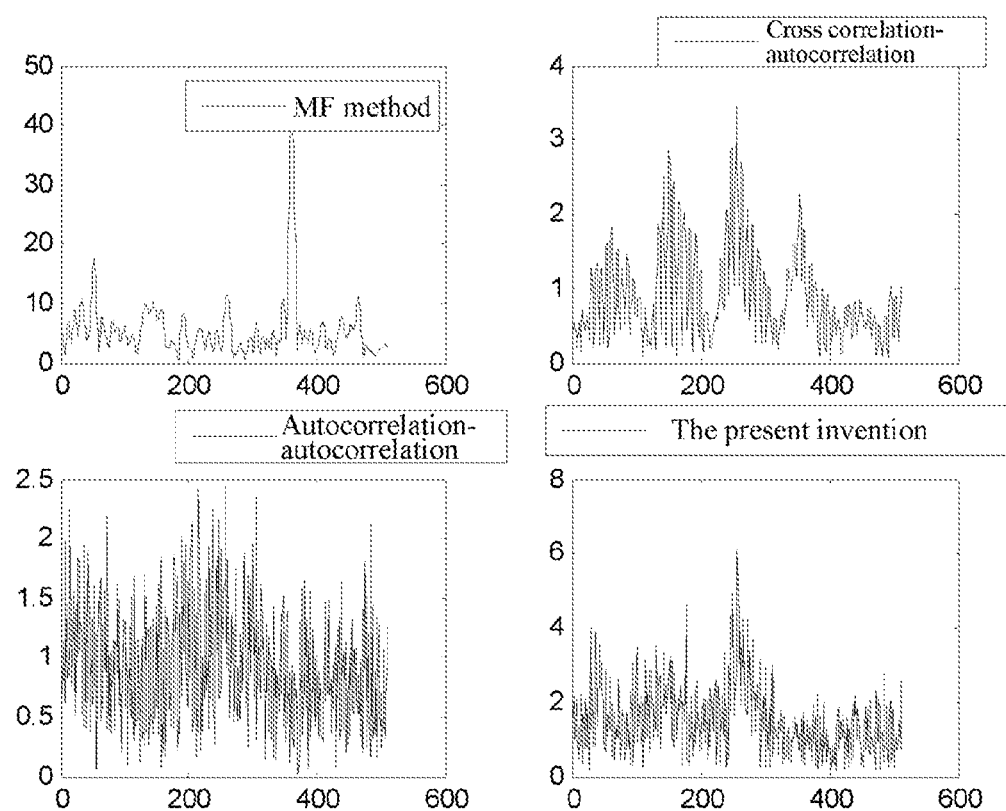
FIG. 6 is a simulation diagram of a test statistics (SNR=7 dB) in various methods on an AWGN channel when $\varepsilon=1.8\Delta f$.

In this subparagraph, PSS detection and synchronization performance in the present invention under different SNRs are to be verified. In simulation, a length of a CP Ncp is equal to 64, a sequence number a root sequence of a PSS is u=25, $\Delta f=15$ kHz is a subcarrier spacing, and a CFO is $\varepsilon=1.8\Delta f$. FIG. 6 provides a test statistics in various methods when an SNR is equal to 3 dB. It can be learned from FIG. 6 that, when the SNR is equal to 3 dB, when $\varepsilon=0.8\Delta f$, a time synchronization location of the MF method is distant from an actual synchronization location, and therefore, synchronization cannot be completed. It can be seen that the MF method is sensitive to a frequency offset.

Different from the MF method, the other three detection methods and synchronization methods for a PSS (including the present invention) are insensitive to a CFO. However, it can be learned from FIG. 5 and FIG. 6 that, when an SNR is reduced, performance of the autocorrelation-autocorrelation method becomes poor, and peak values are to be similar, and therefore, a time synchronization location cannot be determined. Compared with the cross correlation-autocorrelation method, in the technical solution provided by the present invention, a difference between a primary peak value and a secondary peak value is more obvious, and therefore, detection performance is better. It can be seen that the PSS detection and synchronization solution of the present invention has better detection performance.

(c) Impact of a CP Length on PSS Detection and Synchronization Performance

Figure 7:
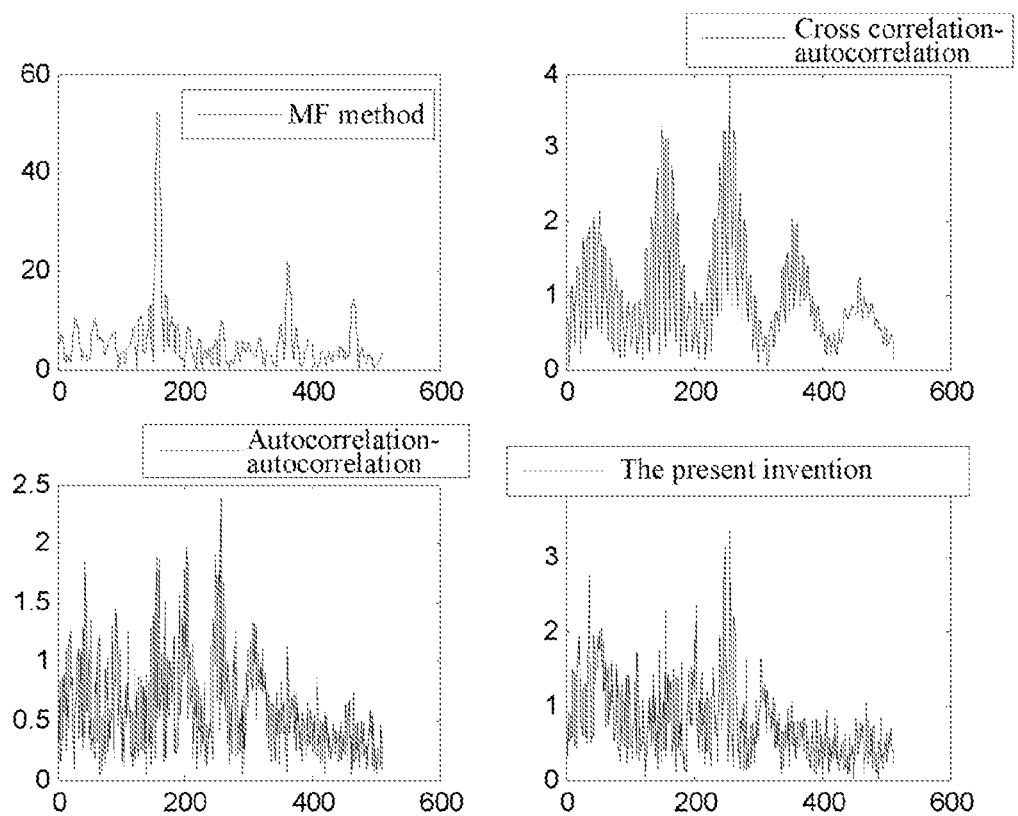
FIG. 7 is a simulation diagram of a test statistics (SNR=10 dB) in various methods on an AWGN channel when a CP length Ncp=40.
Figure 8:
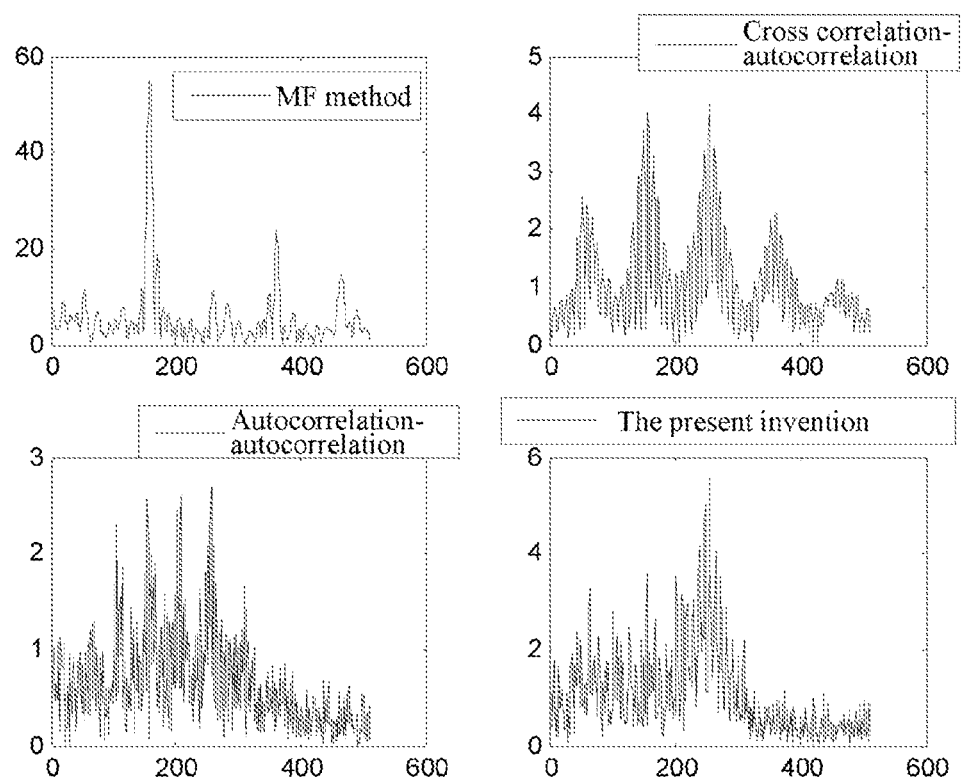
FIG. 8 is a simulation diagram of a test statistics (SNR=10 dB) in various methods on an AWGN channel when a CP length Ncp=80.
Figure 9:
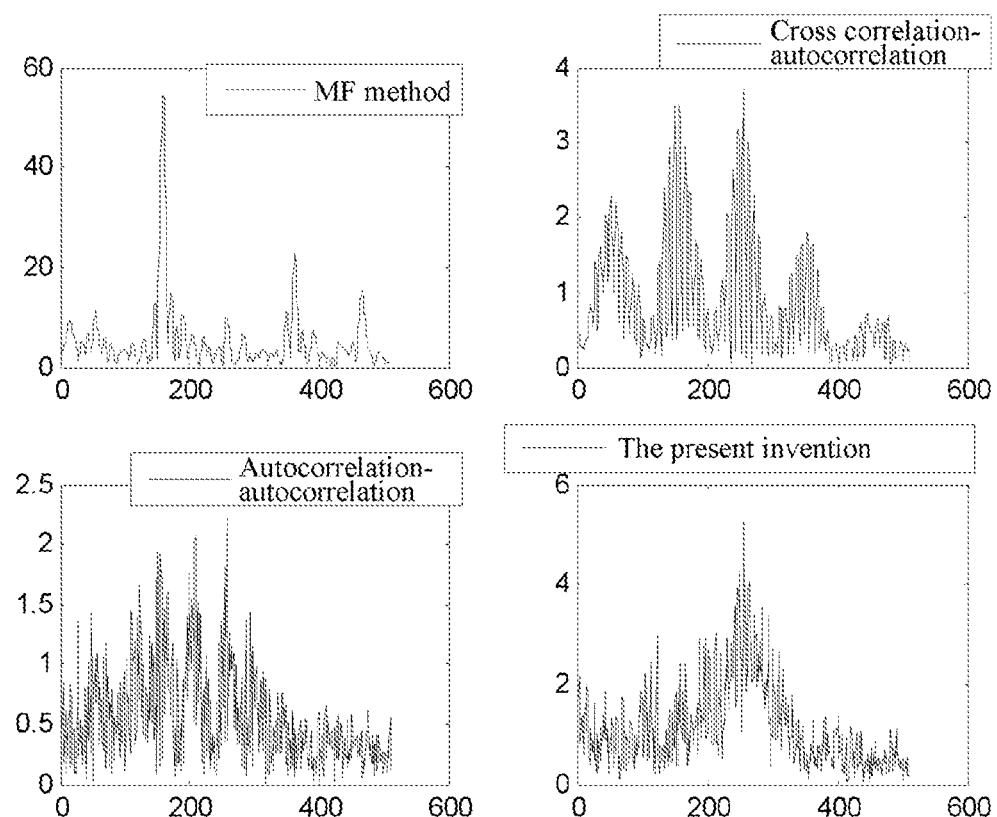
FIG. 9 is a simulation diagram of a test statistics (SNR=10 dB) in various methods on an AWGN channel when a CP length Ncp=120.

In this subparagraph, detection and synchronization performance in the present invention under different CP lengths are to be verified. In simulation, an SNR is equal to 10 dB, a subcarrier quantity N of an OFDM symbol is equal to 512, a sequence number a root sequence of a PSS is u=25, a subcarrier spacing is $\Delta f=15$ kHz, and a CFO is $\varepsilon=2.8\Delta f$. FIG. 7 provides a test statistics in various methods when a CP length Ncp is equal to 40. FIG. 8 provides a test statistics in various methods when a CP length Ncp is equal to 80. FIG. 9 provides a test statistics in various methods when Ncp is equal to 120.

It can be learned from FIG. 7 and FIG. 8 that, in the MF method, when $\varepsilon=0.8\Delta f$, regardless of how a CP length changes, a time synchronization location of the MF method is distant from an actual synchronization location, and therefore, synchronization cannot be completed. It can be seen that the MF method is sensitive to a frequency offset.

Compared with the autocorrelation-autocorrelation method and the cross correlation-autocorrelation method, in the technical solution provided by the present invention, a difference between a primary peak value and a secondary peak value is more obvious, and therefore, detection performance of the present invention is better. In addition, when the CP length increases, under a same SNR condition, the primary peak value in the present invention becomes more obvious. Therefore, when the CP length increases, the PSS detection performance of the present invention becomes better.

B. A Simulation Result on a Multipath Channel (for Example, a Pedestrian Channel B, with Six Paths)

(a) Impact of a CFO on PSS Detection and Synchronization Performance

Figure 10:
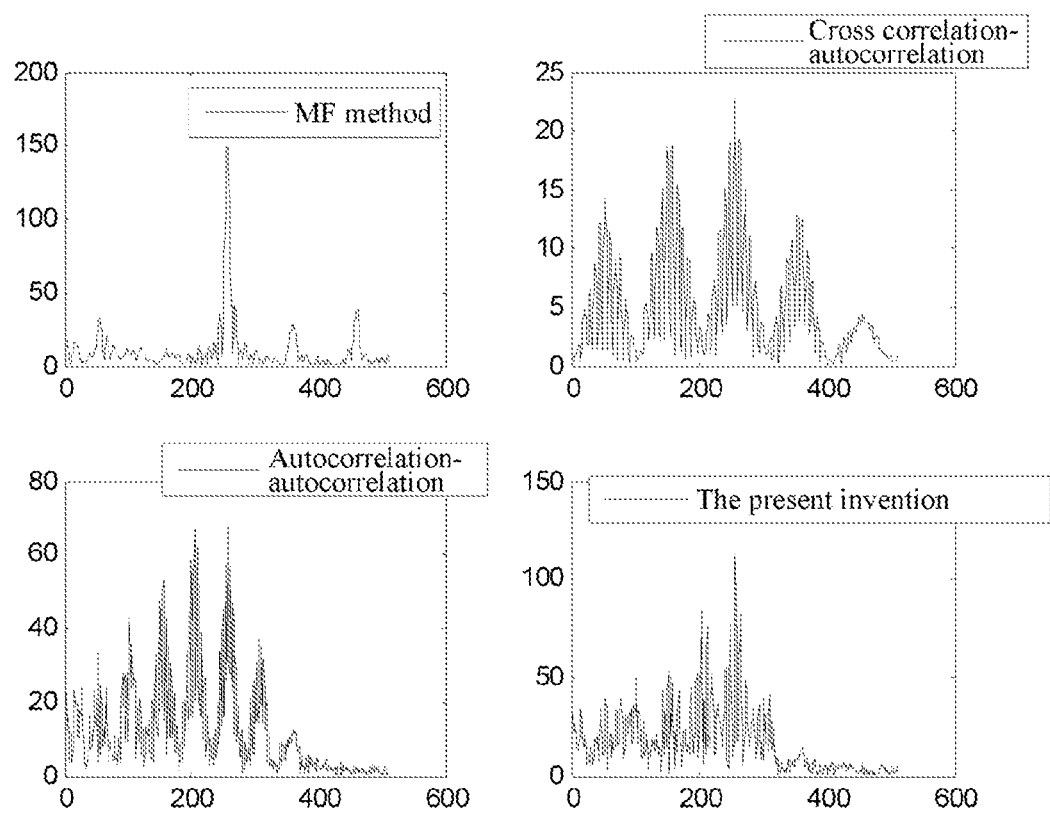
FIG. 10 is a simulation diagram of a test statistics (SNR=10 dB) in various methods on a multipath channel when $\varepsilon=0.1\Delta f$.
Figure 11:
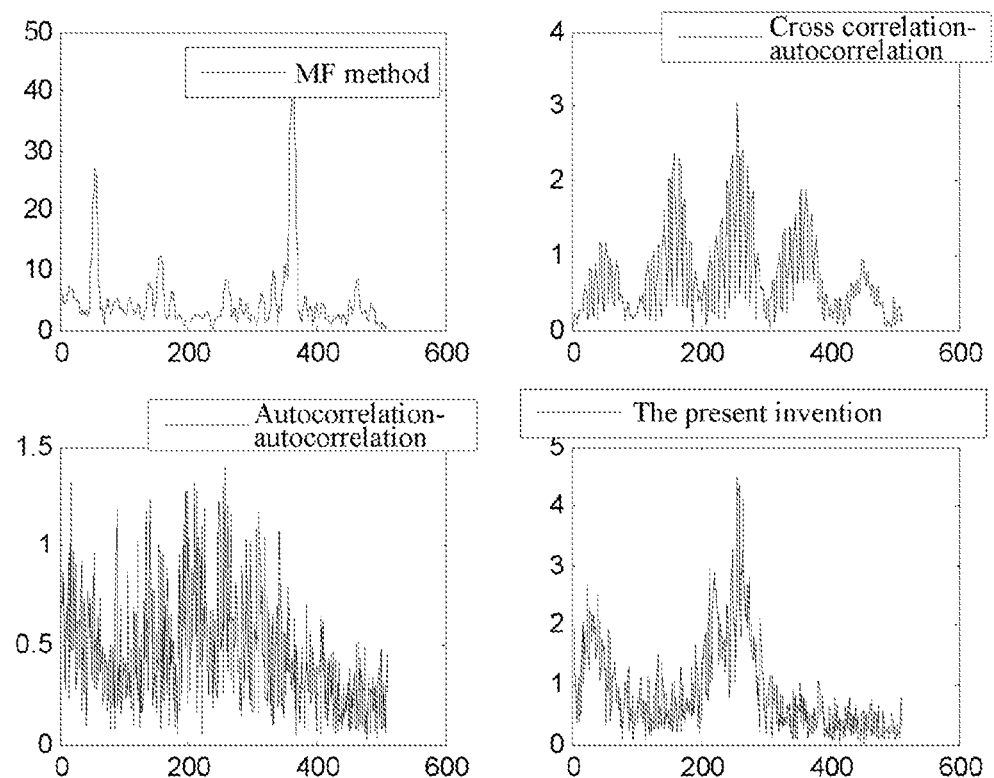
FIG. 11 is a simulation diagram of a test statistics (SNR=10 dB) in various methods on a multipath channel when $\varepsilon=1.8\Delta f$.

In this subparagraph, impact of a CFO on PSS detection and synchronization performance of the present invention is to be verified. In simulation, an SNR is equal to 10 dB, a subcarrier quantity N of an OFDM symbol is equal to 512, a length of a CP Ncp is equal to 64, a sequence number of a root sequence of a PSS is u=25, and $\Delta f$=15 kHz is a subcarrier spacing. FIG. 10 provides a test statistics in various methods when $\varepsilon$=0.1$\Delta f$. FIG. 11 provides a test statistics in various methods when $\varepsilon$=0.8$\Delta f$. It can be learned from FIG. 10 and FIG. 11 that, when the CFO $\varepsilon$=0.1$\Delta f$, the MF method can also have good detection and synchronization performance, but when $\varepsilon$=0.8$\Delta f$, a time synchronization location of the MF method is distant from an actual synchronization location, and therefore, even if an SNR is high, synchronization cannot be completed. It can be seen that the MF method is sensitive to the CFO.

Different from the MF method, in the other three detection methods and synchronization methods for a PSS (including the present invention), detection and synchronization can be performed when the CFO is either large or small, that is, their detection performance is not affected by the CFO. However, in the autocorrelation-autocorrelation method, a difference between a primary peak value and a secondary peak value is not obvious. Compared with the other two existing methods, regardless of a large or small CFO, a difference between a primary peak and a second peak in the present invention is more obvious, and therefore, the present invention has better PSS detection and synchronization performance Therefore, the present invention is better than the existing autocorrelation-autocorrelation method and cross correlation-autocorrelation method.

(b) Impact of an SNR on PSS Detection and Synchronization Performance

Figure 12:
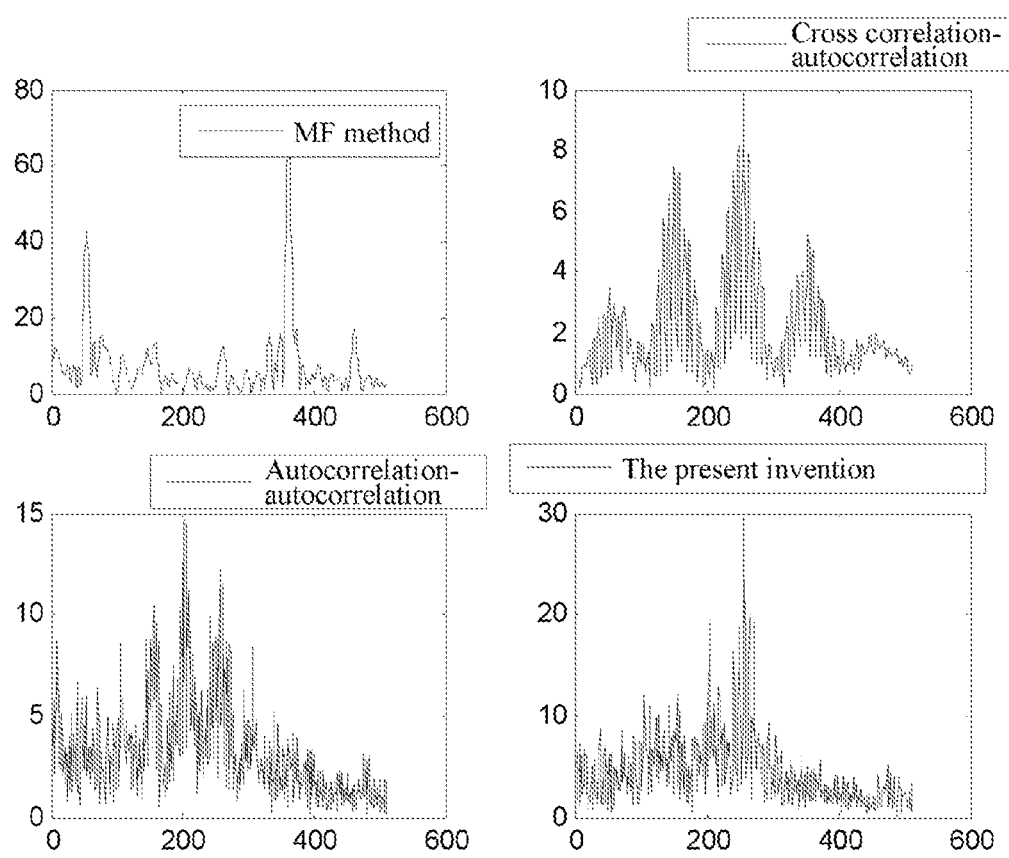
FIG. 12 is a simulation diagram of a test statistics (SNR=7 dB) in various methods on a multipath channel when $\varepsilon=1.8\Delta f$.

In this subparagraph, PSS detection and synchronization performance in the present invention under different SNRs are to be verified. In simulation, a length of a CP Ncp is equal to 64, a sequence number a root sequence of a PSS is u=25, $\Delta f$=15 kHz is a subcarrier spacing, and a CFO is $\varepsilon$=1.8$\Delta f$. FIG. 12 provides a test statistics in various methods when an SNR is equal to 7 dB. It can be learned from FIG. 12 that, when the SNR is equal to 7 dB, when $\varepsilon$=1.8$\Delta f$, a time synchronization location of the MF method is distant from an actual synchronization location, and therefore, synchronization cannot be completed. It can be seen that the MF method is sensitive to a frequency offset.

Different from the MF method, the other three detection methods for a PSS (including the present invention) are insensitive to a CFO. However, it can be learned from FIG. 11 and FIG. 12 that, when an SNR is reduced, performance of the autocorrelation-autocorrelation method becomes poor, and peak values are to be similar, and therefore, a time synchronization location cannot be determined. Compared with the cross correlation-autocorrelation method, in the present invention, a difference between a primary peak value and a secondary peak value is more obvious, and therefore, detection performance is better. It can be seen that the present invention has better detection performance.

(c) Impact of a CP Length on PSS Detection and Synchronization Performance

Figure 13:
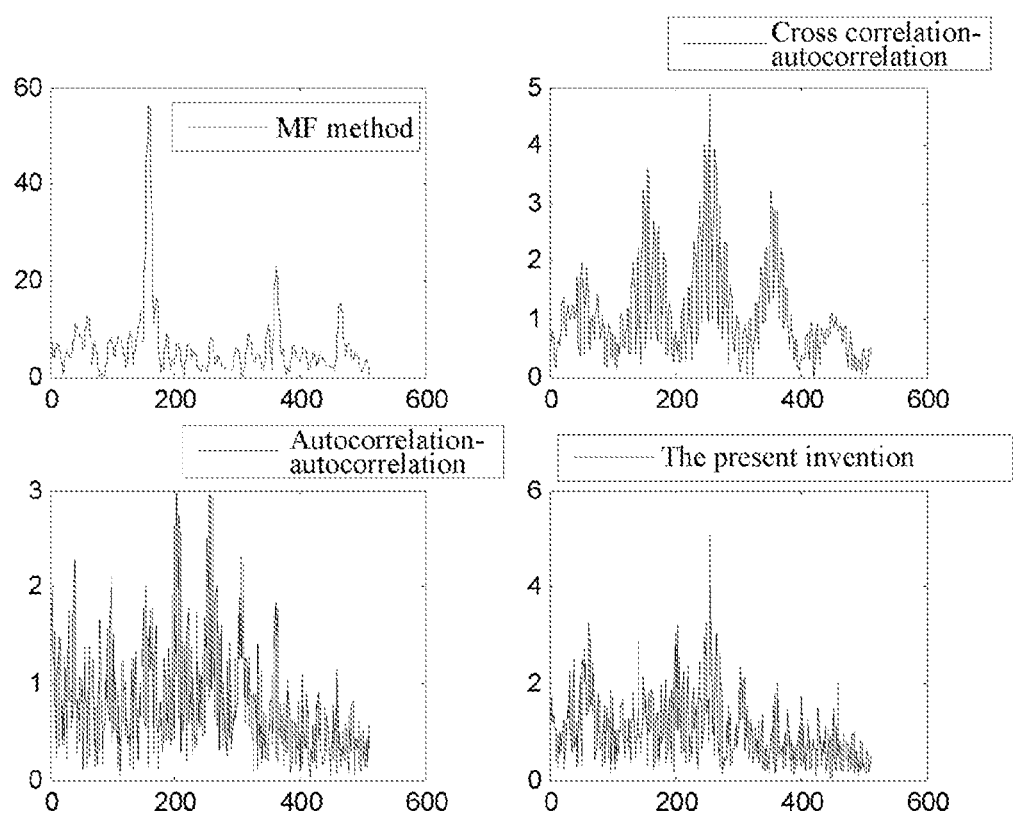
FIG. 13 is a simulation diagram of a test statistics (SNR=10 dB) in various methods on a multipath channel when a CP length Ncp=40.
Figure 14:
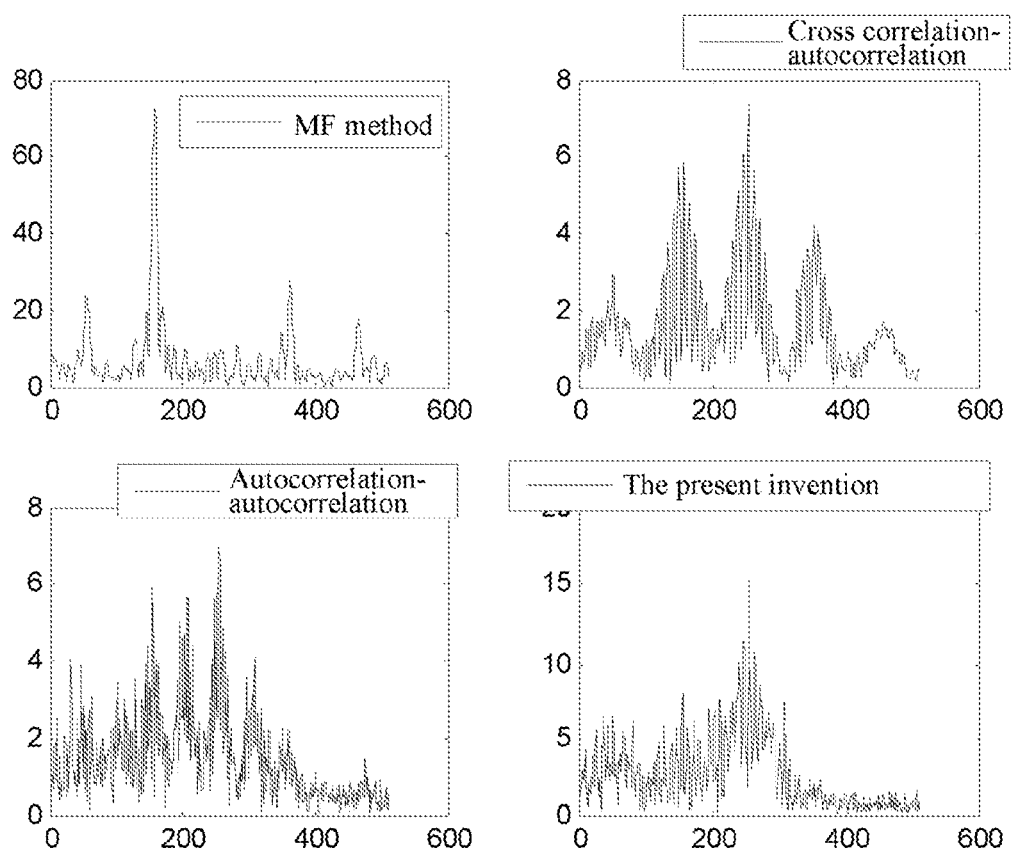
FIG. 14 is a simulation diagram of a test statistics (SNR=10 dB) in various methods on a multipath channel when a CP length Ncp=80.
Figure 15:
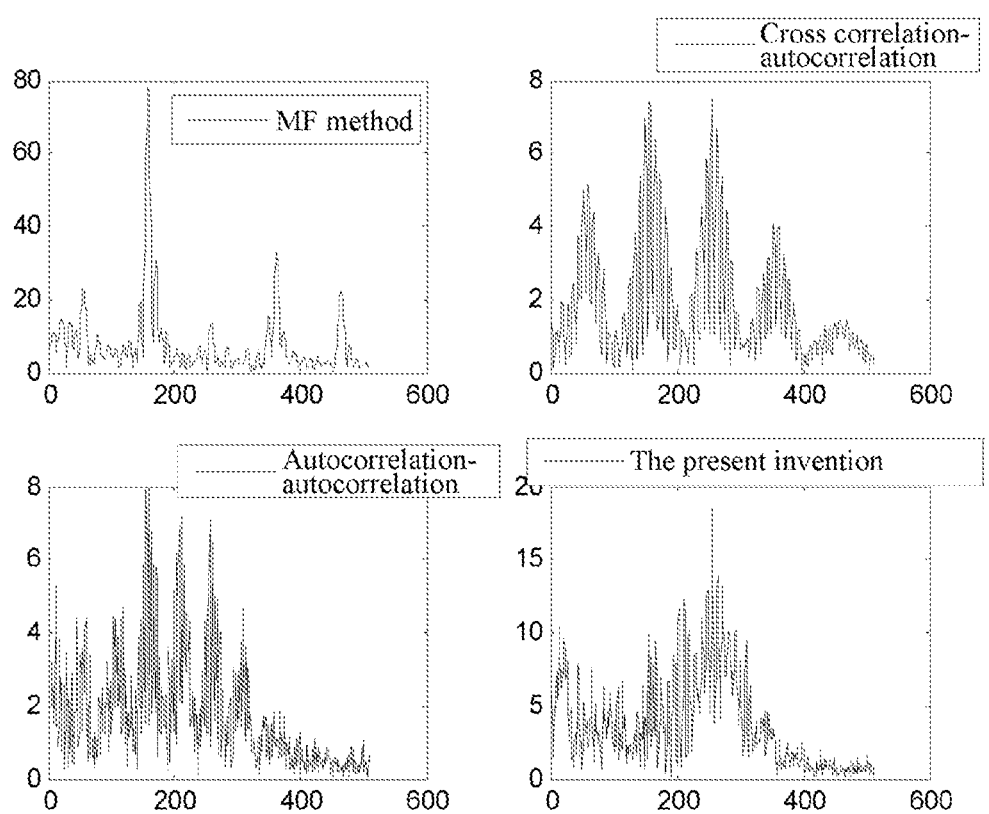
FIG. 15 is a simulation diagram of a test statistics (SNR=10 dB) in various methods on a multipath channel when a CP length Ncp=120.

In this subparagraph, detection and synchronization performance in the present invention under different CP lengths are to be verified. In simulation, an SNR is equal to 10 dB, a subcarrier quantity N of an OFDM symbol is equal to 512, a sequence number a root sequence of a PSS is u=25, a subcarrier spacing is $\Delta f$=15 kHz, and a CFO is $\varepsilon$=2.8$\Delta f$. FIG. 13 provides a test statistics in various methods when a CP length Ncp is equal to 40. FIG. 14 provides a test statistics in various methods when a CP length Ncp is equal to 80. FIG. 15 provides a test statistics in various methods when a CP length Ncp is equal to 120.

It can be learned from FIG. 13, FIG. 14, and FIG. 15 that, in the MF method, when $\varepsilon$=0.8$\Delta f$, regardless of how a CP length changes, a time synchronization location of the MF method is distant from an actual synchronization location, and therefore, synchronization cannot be completed. It can be seen that the MF method is sensitive to a frequency offset.

Compared with the autocorrelation-autocorrelation method and the cross correlation-autocorrelation method, in the present invention, a difference between a primary peak value and a secondary peak value is more obvious, and therefore, detection performance of the present invention is better. In addition, when the CP length increases, under a same SNR condition, the primary peak value in the present invention becomes more obvious. Therefore, when the CP length increases, the PSS detection performance of the present invention becomes better.

It can be seen from the simulation results that the present invention has the following advantages:

(1) In the aspect of affecting detection performance by a CFO, the MF method is sensitive to the CFO. When the CFO becomes large, timing cannot be performed. The present invention eliminates impact of a CFO on detection performance by using a sliding autocorrelation-based technology, and therefore, is insensitive to the CFO.

(2) In the aspect of detection performance when an SNR is small, detection performance of the present invention is better than the existing autocorrelation-autocorrelation method and cross correlation-autocorrelation method. In addition, the foregoing theoretical analysis indicates that complexity of calculation of the present invention is only ⅙ of the cross correlation-autocorrelation method, and is slightly higher than complexity of calculation of the autocorrelation-autocorrelation method.

(3) In the aspect of impact of a cyclic prefix on detection performance, based on the cross correlation-autocorrelation method, the present invention further uses information about a cyclic prefix to calculate a test statistics, and therefore, its performance is better than the cross correlation-autocorrelation method. In addition, as a length of the cyclic prefix increases, detection performance of the present invention becomes better.

The foregoing theoretical analysis and simulation result both indicate that, compared with the prior art, the present invention is not affected by a CFO, and still has good performance when an SNR is low. In addition, the present invention has relatively low complexity of calculation, and is easy to implement. Moreover, the present invention is not only applicable to a common mobile communications terminal such as a mobile phone, but also applicable to an IoT device, such as a sensor, with low power consumption and a simple function (where a relatively great CFO is caused due to low crystal oscillator precision).

The foregoing describes in detail the detection method, the synchronization method, and the terminal for a symmetrical synchronization signal that are provided by the present invention. Any apparent modifications made by a person of ordinary skill in the art without departing from the essence and spirit of the present invention all constitutes an infringement to the patent rights of the present invention, and shall bear corresponding legal liabilities.

What is claimed is:

1. A detection method for a symmetrical synchronization signal, comprising the following steps:

calculating a first-part-first-autocorrelation function for each term symmetrical in time domain;

calculating a second-part-first-autocorrelation function of each symmetrical term of cyclic prefix (CP);

performing a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] + \sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m, \theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol, and detecting the PSS by detecting a peak of $|(m,\theta)|$ that is greater than or equal to a predetermined threshold.

2. The synchronization detection method according to claim 1, wherein:

the second correlation calculation is:

performing a second autocorrelation calculation on the first-part-first-autocorrelation function, to obtain a first-part-second-autocorrelation function; and performing a second correlation calculation on the second-part-first-autocorrelation function, to obtain a second-part-second-correlation function.

3. The synchronization detection method according to claim 2, wherein:

performing the second correlation calculation on the second-part-first-autocorrelation function includes performing correlation calculation on the second-part-first-autocorrelation function and the first-part-first-autocorrelation function.

4. The synchronization detection method according to claim 3, wherein:

performing the second correlation calculation on the first-part-first-autocorrelation function is: performing the autocorrelation calculation on the first-part-first-autocorrelation function based on a symmetry center of the first-part-first-autocorrelation function.

5. A synchronization method for a symmetrical synchronization signal, comprising the following steps:

calculating a first-part-first-autocorrelation function for each term symmetrical in time domain;

calculating a second-part-first-autocorrelation function of each symmetrical term of cyclic prefix (CP);

performing a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] + \sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m,\theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol, and compensating the received signal by using the test statistics of the received signal of PSS.

6. The synchronization method according to claim 5, further comprising the following step:

after the compensation, obtain a sequence number of the PSS sequence for signal synchronization.

7. A communication terminal for detecting a symmetrical synchronization signal, comprising a signal processing unit, wherein the signal processing unit calculates a first-part-first-autocorrelation function for each term symmetrical in time domain, calculates a second-part-first-autocorrelation function of each symmetrical term of cyclic prefix (CP);

performs a second correlation calculation on the first-part-first-autocorrelation function and the second-part-first-autocorrelation function, to obtain a test statistics of a received signal of primary synchronization signal (PSS) by following formula:

$$P(m, \theta) = \sum_{j=1}^{N/4-1} [Q_{PSS}(m, \theta, j) \cdot Q_{PSS}(m, \theta, N/2 - j)] + \sum_{j=1}^{N_{CP}} [Q_{PSS}(m, \theta, j) \cdot Q_{CP}(m, \theta, j)],$$

$$m = 0, 1, \ldots, N - 1$$

where $Q_{PSS}(m,\theta,j)$ is the first-part-first-autocorrelation function, $Q_{CP}(m,\theta,i)$ is the second-part-first-autocorrelation function, $P(m,\theta)$ is the test statistics of the received signal of PSS, m is a time synchronization point of PSS, $\theta$ indicates a time offset that needs to be estimated, N is a length of an OFDM symbol; and detects the PSS by detecting a peak of $|P(m,\theta)|$ that is greater than or equal to a predetermined threshold.

8. The communications terminal according to claim 7, wherein the signal processing unit compensates the received signal by using the test statistics of the received signal of PSS.

* * * * *